(12) United States Patent
Suzuki

(10) Patent No.: US 7,744,225 B2
(45) Date of Patent: Jun. 29, 2010

(54) LIGHT SOURCE APPARATUS THAT COLLECTS AND PROVIDES DIFFERENT-COLORED LIGHT RAYS EMITTED BY A PLURALITY OF DIFFERENT-COLORED LIGHT SOURCES AND A PROJECTOR COMPRISING SUCH LIGHT SOURCE APPARATUS

(75) Inventor: Yukio Suzuki, Hamura (JP)

(73) Assignee: Casio Computer Co., Ltd., Tokyo (JP)

( * ) Notice: Subject to any disclaimer, the term of this patent is extended or adjusted under 35 U.S.C. 154(b) by 1143 days.

(21) Appl. No.: 11/374,646

(22) Filed: Mar. 13, 2006

(65) Prior Publication Data

US 2006/0209270 A1    Sep. 21, 2006

(30) Foreign Application Priority Data

Mar. 15, 2005    (JP)    ............................. 2005-072870

(51) Int. Cl.
  *G03B 21/28*    (2006.01)
  *F21S 10/02*    (2006.01)

(52) U.S. Cl. ........................... 353/94; 353/98; 362/231; 362/249.02; 362/311.08

(58) Field of Classification Search .................... 353/94, 353/98, 99; 349/67, 5, 7, 8, 9; 362/249.02, 362/230, 231, 247, 296.06, 311.08
See application file for complete search history.

(56) References Cited

U.S. PATENT DOCUMENTS

| | | | | |
|---|---|---|---|---|
| 6,523,977 | B2 * | 2/2003 | Chuang et al. | 362/231 |
| 6,945,672 | B2 * | 9/2005 | Du et al. | 362/241 |
| 7,070,301 | B2 * | 7/2006 | Magarill | 362/241 |
| 7,134,775 | B2 * | 11/2006 | Oishi et al. | 362/545 |
| 7,380,962 | B2 * | 6/2008 | Chaves et al. | 362/293 |
| 2007/0189019 | A1 * | 8/2007 | Klipstein | 362/347 |
| 2009/0066920 | A1 * | 3/2009 | Yamagishi et al. | 353/99 |

FOREIGN PATENT DOCUMENTS

| | | |
|---|---|---|
| JP | 2003-317513 A | 11/2003 |
| JP | 2003-317514 A | 11/2003 |
| JP | 2004-279550 A | 10/2004 |

* cited by examiner

*Primary Examiner*—William C Dowling
(74) *Attorney, Agent, or Firm*—Frishauf, Holtz, Goodman & Chick, P.C.

(57) ABSTRACT

In a light source apparatus, a reflector has an inner reflective surface complementary to a part of the outer surface of an ellipsoid with a pair of focal points. The surface part has a first one of the pair of focal points therewithin. An array of light emitting elements is disposed at the position of the first focal point within the reflective surface. Thus, light rays emitted by the array of light emitting elements are reflected by the inner surface of the reflector so as to be focused at the other of the pair of focal points.

24 Claims, 15 Drawing Sheets

DIRECTION OF EMISSION

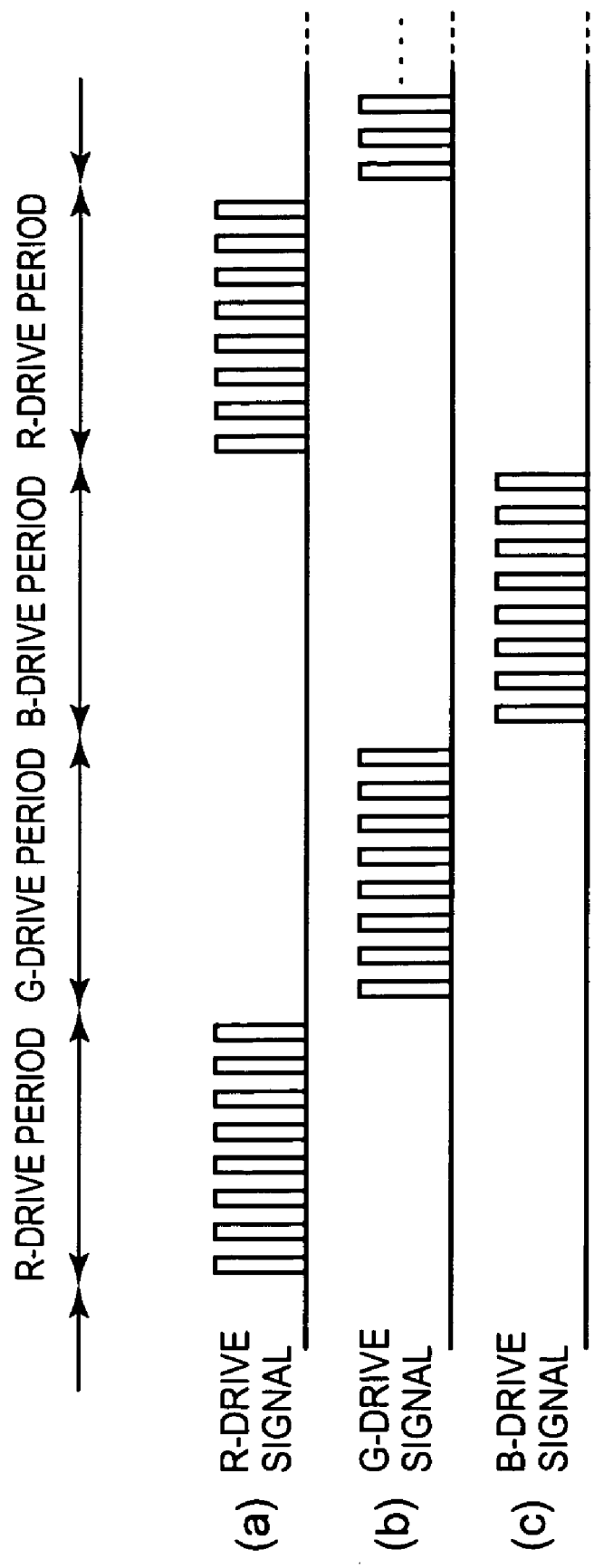

LIGHT SOURCE APPARATUS THAT COLLECTS AND PROVIDES DIFFERENT-COLORED LIGHT RAYS EMITTED BY A PLURALITY OF DIFFERENT-COLORED LIGHT SOURCES AND A PROJECTOR COMPRISING SUCH LIGHT SOURCE APPARATUS

BACKGROUND OF THE INVENTION

1. Field of the Invention

The present invention relates to light source apparatus and more particular to such apparatus that collects and provides different-colored light rays from a plurality of different-colored light sources, and a projector comprising such light source apparatus.

2. Background Art

On-vehicle light source apparatus are known that comprise LEDs (Light Emitting diodes) and a reflector that reflects light rays emitted by the LEDs. These light source apparatus are used, for example, as head lamps for a vehicle and the LEDs are miniaturized so as to reduce power consumption.

In one such source apparatus, a white LED is disposed at a first focal point of a concave reflector comprising a part of an elliptical surface. Light rays emitted by the white LED are reflected and focused by the reflector at a second focal point. The light source apparatus provides the light rays as parallel or dispersive light rays using a lens.

Some conventional projectors used to project an image on a screen require a light source apparatus such as is used in the vehicle. The light source apparatus use a white-light emitting discharge lamp comprising a high pressure mercury arc as the light source from a viewpoint of the use efficiency of light rays. Some conventional projectors comprise a reflector that reflects light rays from a discharge lamp with its inner surface so as to be focused to an inlet of a light tunnel.

SUMMARY OF THE INVENTION

In one aspect, the present invention provides a light source apparatus. In the light source, a reflector has an inner reflective surface complementary to a part of the outer surface of an ellipsoid with a pair of focal points. The reflector has a focal point within the inner surface thereof coinciding in position with one of the pair of focal points. An array of light emitting elements is disposed at the focal point within the inner surface of the reflector whereby light rays emitted by the light emitting elements of the array are reflected by the inner surface of the reflector so as to be focused at a point coinciding in position with the other of the pair of focal points.

In another aspect, the present invention also provides another light source apparatus. In this apparatus, a reflector has an inner reflective surface complementary to a part of the outer surface of an ellipsoid with a pair of focal points. The reflector has a focal point within the inner surface of the reflector coinciding in position with one of the pair of focal points. An array of light emitting elements is disposed at the focal point within the inner surface of the reflector, whereby light rays emitted by the array of light emitting elements are reflected by the inner surface of the reflector so as to be focused at a point coinciding in position with the other of the pair of focal points. Furthermore, a light tunnel has an inlet positioned at a point coinciding in position with the second focal point of the ellipsoid.

In a further aspect, the present invention also provides a projector. In this projector, (a) a light source apparatus comprises a reflector having an inner reflective surface complementary to a part of the outer surface of an ellipsoid with a pair of focal points. The reflector has a focal point within the inner surface thereof coinciding in position with one of the pair of focal points. In the apparatus, an array of light emitting elements is disposed at the focal point within the inner surface of the reflector, whereby light rays emitted by the array of light emitting elements are reflected by the inner surface of the reflector so as to be focused at a point coinciding in position with the other of the pair of focal points. Furthermore, in the projector, (b) a light tunnel has an inlet positioned at the point coinciding in position with the other of the pair of focal points of the ellipsoid for allowing light rays emitted by the array of light emitting elements to pass therethrough. (c) A time-divisional driver outputs three primary-colored image signals based on image data in a time-divisional manner. (d) A spatial light modulator is irradiated with the light rays having passed through the light tunnel reflect and projecting the light rays as an image based on one of the three primary-colored image signals onto a display screen. (e) An optical controller changes a color of the light rays with which the space light modulator is irradiated so as to match a corresponding one of the three primary-colored images signals outputted in a time-divisional manner by the time-divisional driver.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 21 is a timing chart of operation of the LED driver and light source of FIG. 20.

DETAILED DESCRIPTION OF THE INVENTION

A light source apparatus and a projector according to an embodiment of the present invention will be described reference to the drawings.

Figure 1:
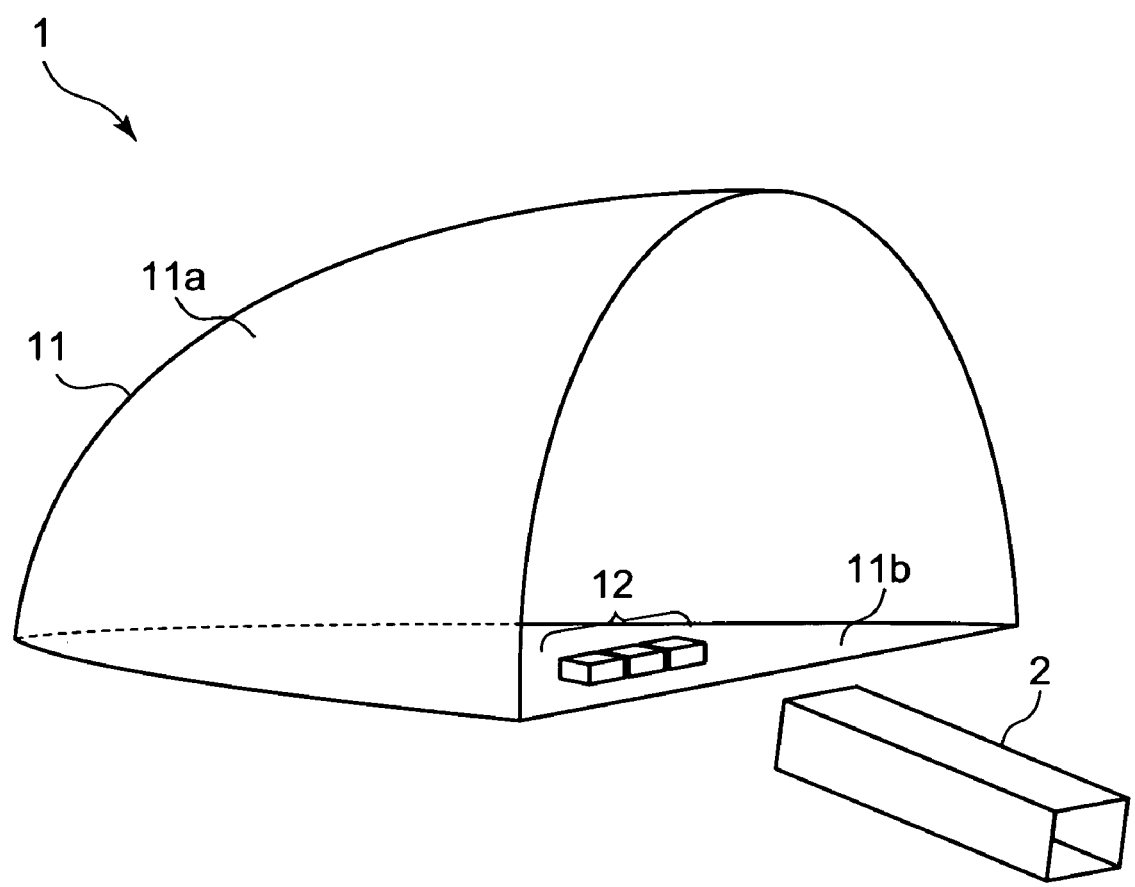
FIG. 1 shows positional relationship between light source apparatus and light tunnel according to an embodiment of the present invention.

Referring to FIG. 1, the light source apparatus 1 is used in the projector and comprises a reflector 11 and an array of light emitting elements (or LEDs) 12.

Figure 2:
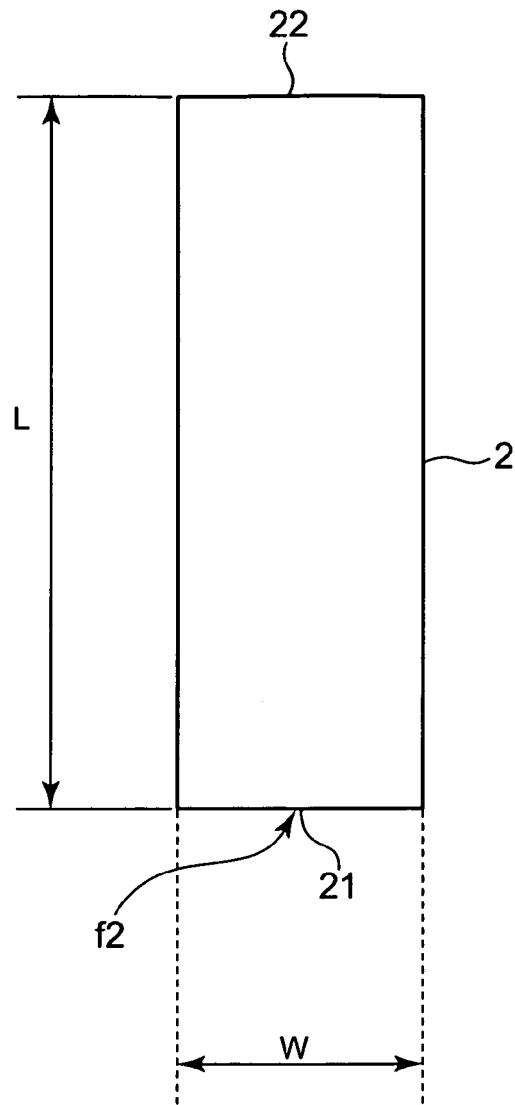
FIG. 2 is a plan view of the light tunnel.
Figure 3:
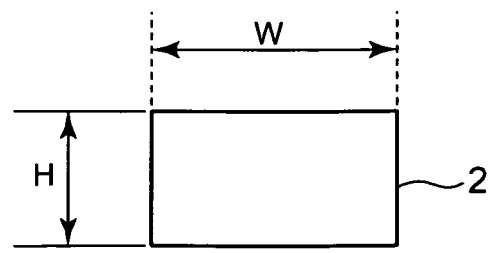
FIG. 3 is a side view of the light tunnel.

A light tunnel 2 is provided to equalize light rays emitted by the light source apparatus 1 and collected by the reflector 11. As shown in FIG. 2, the light tunnel 2 has a length L and a sideways long cross-sectional area of a width W and a height H (i.e., H<W) as shown in FIG. 3. The cross-sectional configuration of this light tunnel 2 corresponds to the size of a spatial light modulator 6 (see FIG. 10) which in turn corresponds to the size of an image that will be projected onto a screen S. The inner surface of the light tunnel 2 is composed of a mirror such that the light rays collected at a tunnel inlet 21 are transmitted through the tunnel 2 while being reflected by the inner surface of the tunnel and then emitted from its exit 22.

The reflector 11 of the light source apparatus 1 is used to reflect light rays from the array of LEDs 12 with the inner surface thereof. The reflector 11 comprises a quarter ellipsoidal shell 11a and a flat base plate 11b.

Figure 4:
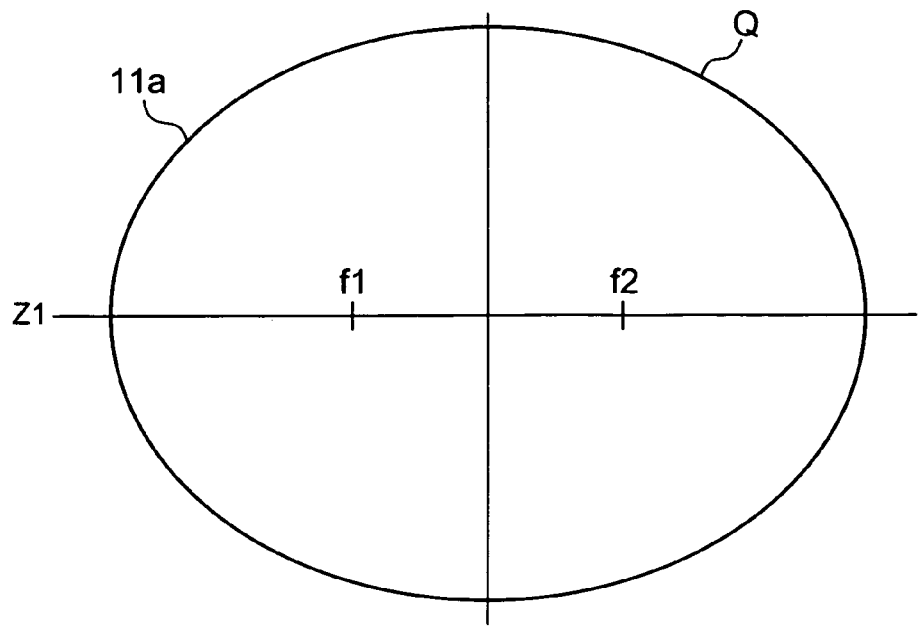
FIG. 4 is a cross-sectional view of a quarter ellipsoidal reflector of the light source apparatus.

Referring to FIG. 4, the ellipsoidal shell 11a has an inner reflective surface in the form of a quarter of an ellipsoid Q with a pair of focal points f1 and f2, and has therewithin a focal point coinciding with a first one (f1) of the pair of focal points.

The reflector 11 is composed of an easy-to-cut material of high heat radiation type such as copper or aluminum. The inner surfaces of the shell 11a and base plate 11b of the reflector 11 are coated with a high reflective material so as to form a mirror surface, thereby reflecting light rays from red, green and blue LEDs 12r, 12g and 12b of the array 12 positioned at the point within the reflector coinciding with the first focal point f1.

The coating of the inner surface of the reflector 11 may be performed as follows: Two same quarter ellipsoidal shells 11a are joined symmetrically with each other so as to form a half ellipsoidal shell, whose inner surface is coated with a reflective material and the half ellipsoidal shell is then turned around its central longitudinal axis. Thus, the coated material is fixed. Then, the two quarter ellipsoidal shells 11a are separated. The inner surface of the base plate 11b coated with the same reflective material is then attached to the quarter ellipsoidal shell 11a so as to form the reflector 11. Such method facilitates the fixing of the mirror material.

The red, green and blue LEDs 12r, 12g and 12g of the array are supplied with required quantities of current to emit red, green and blue light rays, respectively.

A human being's eyes respond to red light rays of approximately 640-770 nm, green light rays of approximately 490-550 nm and blue light rays of approximately 430-490 nm.

For example, the red, green and blue LEDs 12r, 12g and 12b may emit red light rays having a wavelength of 644 nm, green light rays having a wavelength of 525 nm, and blue light rays having a wavelength of 470 nm, respectively.

Figure 5:
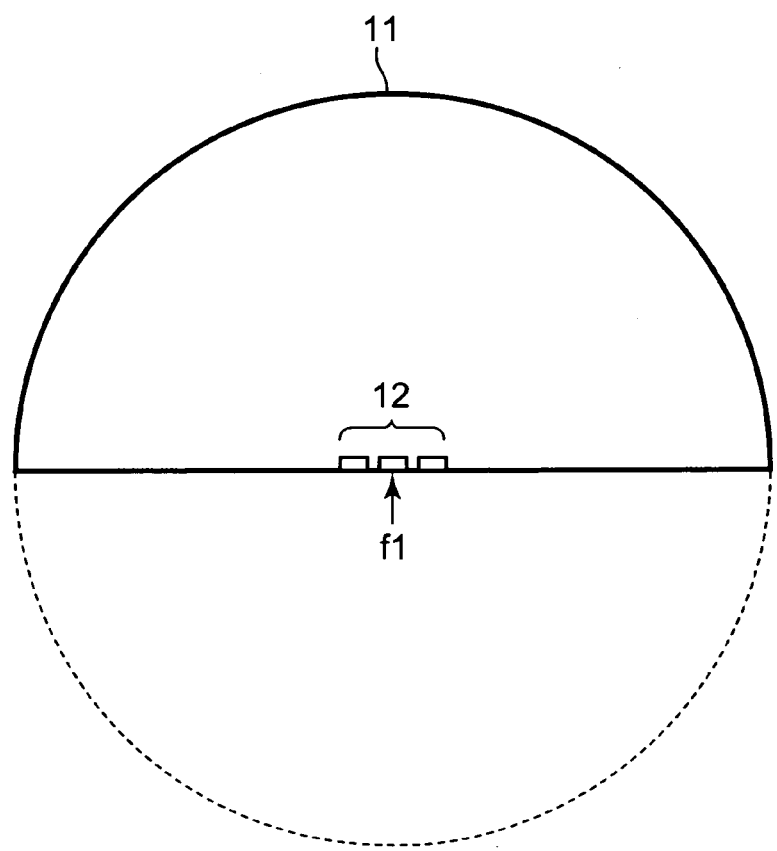
FIG. 5 is a front view of the light source apparatus.
Figure 6:
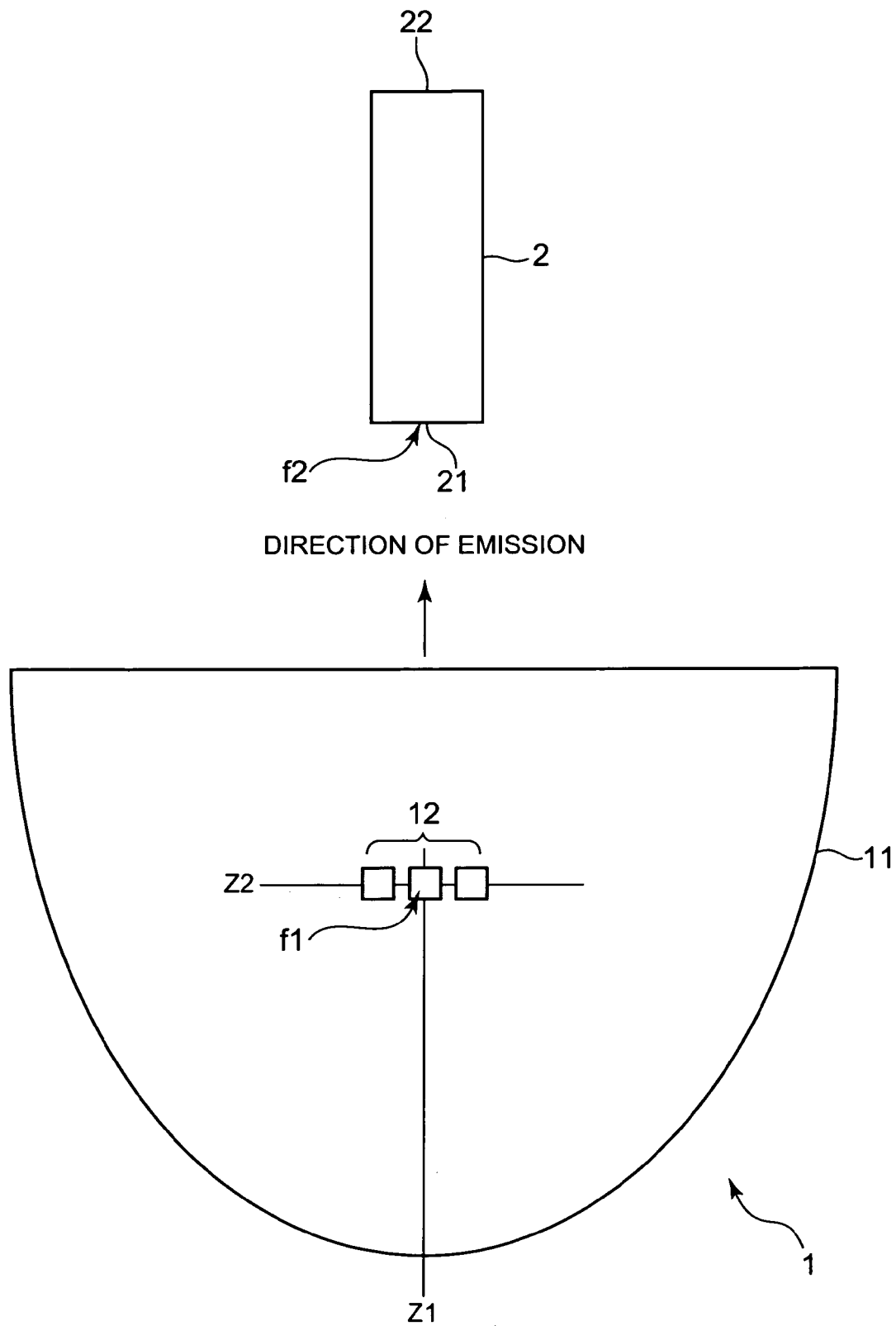
FIG. 6 illustrates in a plan view positional relationship between light source apparatus and light tunnel.

FIG. 5 is a front view of the light source apparatus 1. FIG. 6 is a layout of the light source apparatus 1 and the light tunnel 2. As shown in FIGS. 5 and 6, in order to focus light rays efficiently at the second focal point f2 the array of LEDs 12 is arrnaged at the first focal point f1 within the reflector 11. The red, green and blue LEDs 12r, 12g and 12b are arranged along a straight line Z2 that passes through the first focal point f1 and intersecting at right angles with a center line Z1 passing through the pair of focal points f1 and f2 of the ellipsoid Q.

The arrangement of the red, green and blue LEDs 12r, 12g and 12b varies depending on which of the coloration and brightness of light rays to be focused at the second focal point f2 should be given priority over the other.

Figure 7:
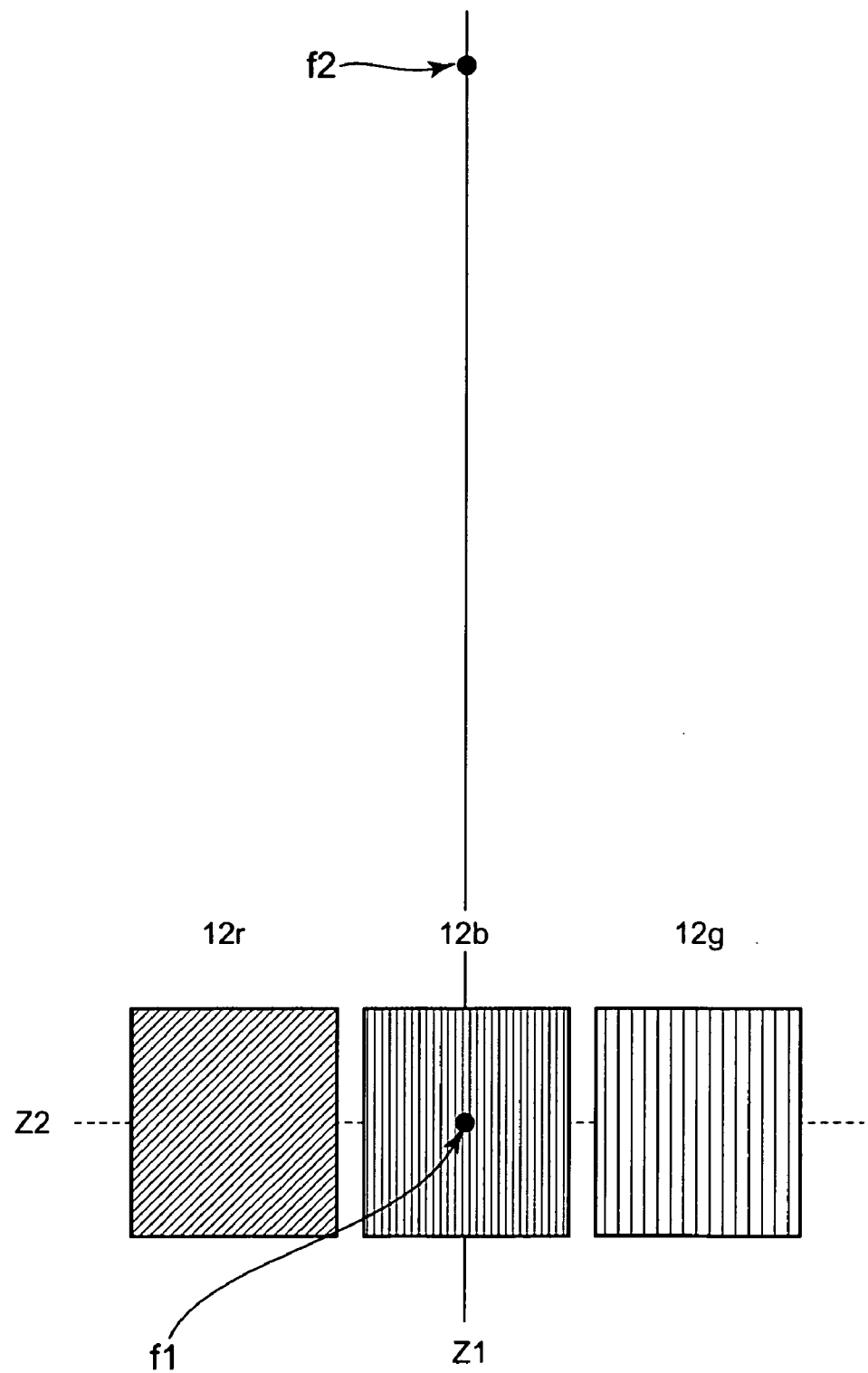
FIG. 7 is a layout of three different-colored LEDs to obtain at a second focal point light rays whose coloration is given priority over the brightness.

When the coloration of the light rays should be, the blue LED 12b having the lowest efficiency of light emission when supplied with sufficient current is disposed at the first focal point f1 with the red and green LEDs 12r and 12g arranged on the right and left sides, respectively, of the blue LED 12b or in reverse order, as viewed in the direction of the second focal point f2 in FIG. 7.

Figure 8:
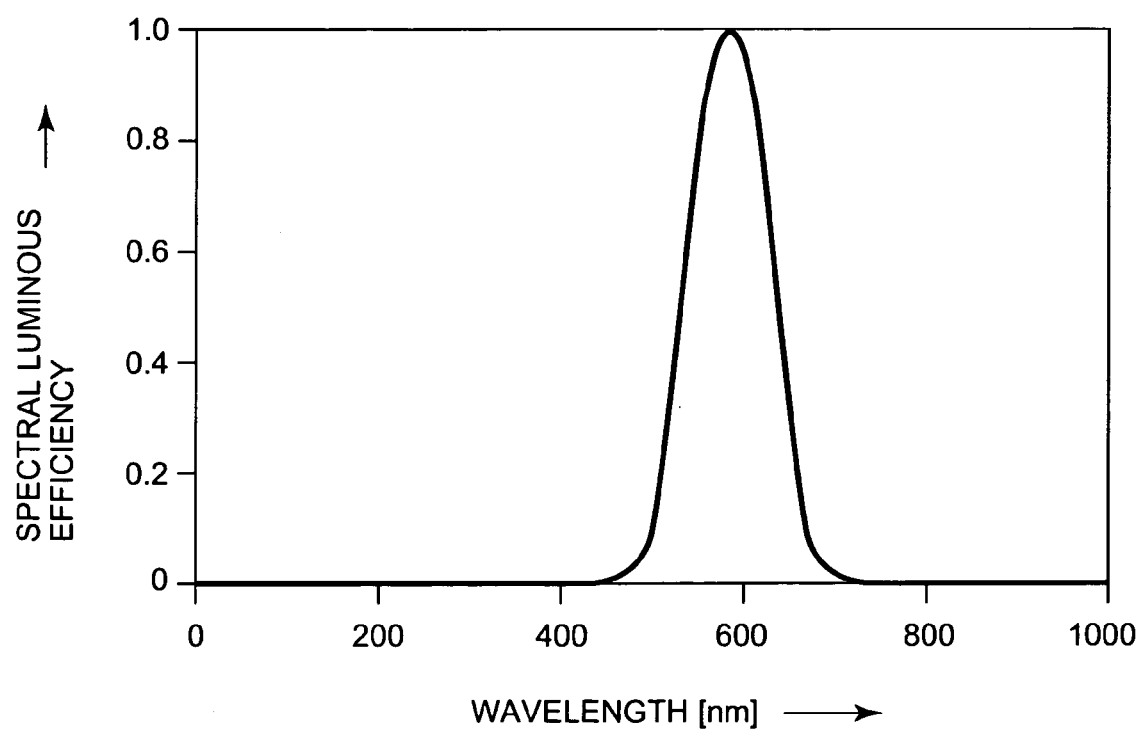
FIG. 8 shows a spectral luminous efficiency curve.
Figure 9:
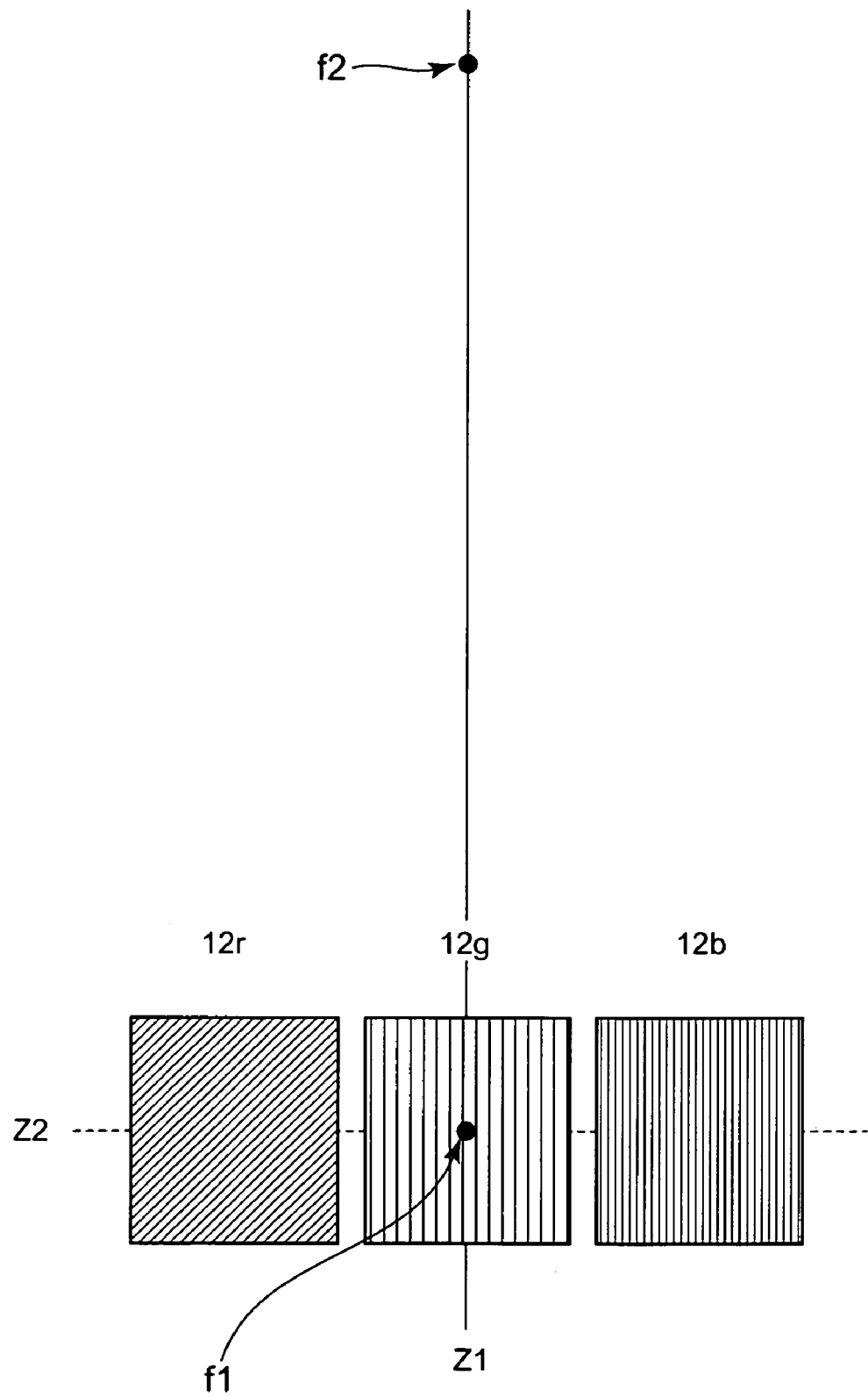
FIG. 9 is a layout of three different-colored LEDs to obtain at a second focal point light rays whose brightness is given priority over the coloration.

In order that the brightness of light rays to be collected at the second focal point f2 should be given priority, the red, green and blue LEDs 12r, 12g and 12b should be arranged along the line Z2 in this order such that the green LED 12g having the highest spectral luminous efficiency is placed at the first focal point f1, as shown in FIG. 9. The spectral luminous efficiency involves the sensitivity of a human being's eyes to light rays varying depending on its wavelength. As shown in FIG. 8, the standard spectral luminous efficiency for photopic vision is maximum at 550 nm.

Figure 10:
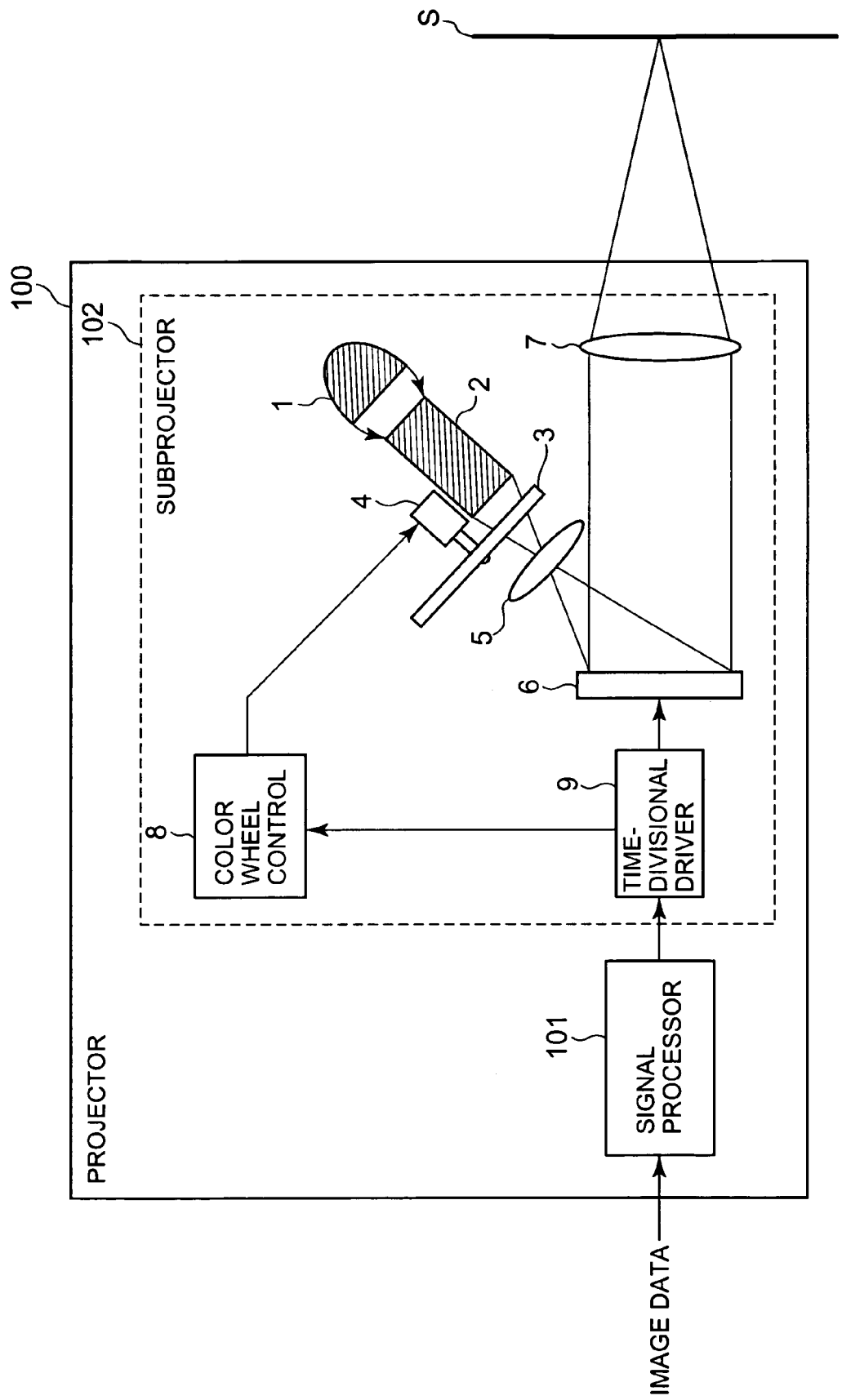
FIG. 10 is a block diagram of a projector that comprises the light source apparatus and light tunnel of FIG. 1.

As shown in FIG. 10, the projector 100 comprises a signal processor 101 and a subprojector 102. The signal processor 101 processes externally received image data so as to provide R(Red), G(Green) and B(Blue) image signals to the subprojector 102, which then projects onto the screen S an image based on the R, G and B image signals. The subprojector 102 comprises the light source apparatus 1 mentioned above, the light tunnel 2 also mentioned above, a color wheel 3, a color wheel motor 4, a light source lens 5, a spatial light modulator 6, a projecting lens 7, a color wheel controller 8 and a time-divisional driver 9.

The color wheel 3 comprises R, G and B filters and a space (which are not shown) arranged therein around the center thereof so as to allow R, G, B and white light components of the light rays to pass through the corresponding filters.

The color wheel controller 8 will receive timing signals based on the R, G and B image signals and a black-and-white image signal D that is produced based on the R, G and B image signals from the time-divisional driver 9 to control the rotation of the color wheel motor 4 such that R, G and B filters and the space arranged in the color wheel 3 are placed sequentially across a path for light rays from the light source 1.

In addition to providing the timing signals, the time-divisional driver 9 provides in a time-divisional manner the R, G, B and D image signals received from the signal processor 101 to the spatial light modulator 6 in synchronization with sequential irradiation of the R, G, B and white or non-colored light components supplied by the color wheel 3 onto the modulator 6, thereby driving the respective micro mirrors of the light modulator 6 and projecting onto the screen S an image corresponding to the image data inputted to the signal processor 101. The white light rays with which the light modulator 6 is irradiated through the space in the color wheel 3 from the light source apparatus 1 is used to increase the whole luminance of the resulting image.

Figure 11:
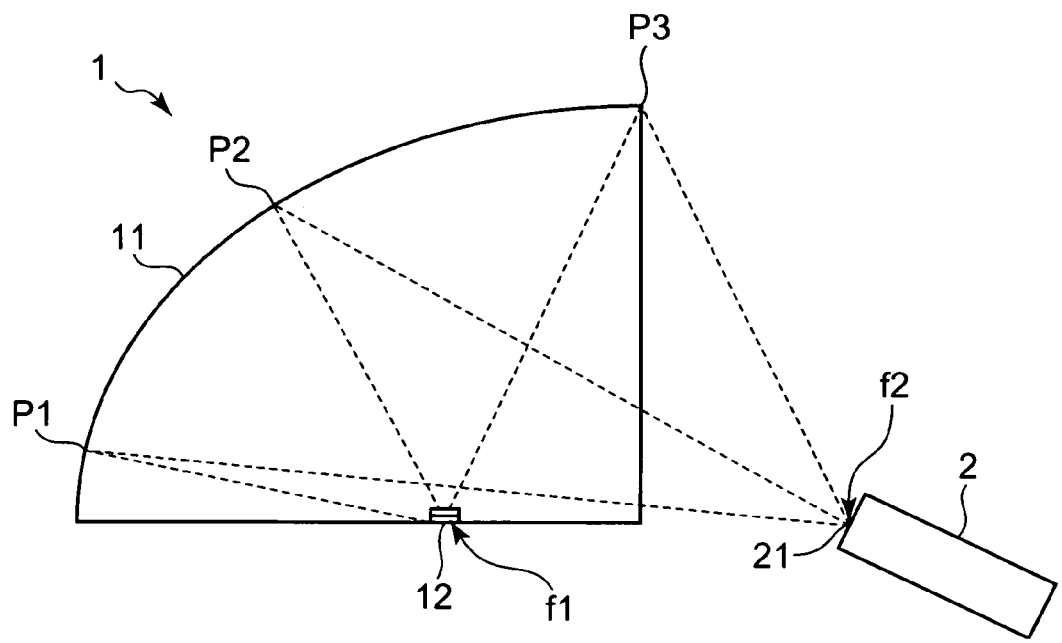
FIG. 11 illustrates operation of the light source apparatus of FIG. 1.

The operation of the projector 100 will be described next. The signal processor 101 processes received image data so as to supply resulting R, G and B signals to the subprojector 102. The reflector 11 of the light source apparatus 1 reflects its incident light rays at points P1, P2 and P3 with the inner surface thereof toward the tunnel inlet 21, as shown in FIG. 11. When the red, blue and green LEDs 12r, 12b and 12g of the array 12 are disposed as shown in FIG. 7, the blue LED 12b disposed at the first focal point f1 is closest to the second focal point f2 compared to the other LEDs 12r and 12g. Thus, the respective spectral luminous efficiencies of the light rays from these LEDs are substantially equal at the tunnel inlet 21, and the respective colorations of the R, G and B light rays are harmonized. Thus, the respective use efficiencies of light rays to be obtained at the tunnel inlet 21 are equalized.

When the red, green and blue LEDs 12r, 12g and 12b are arranged as shown in FIG. 9, light rays from the green LED 12g arranged at the first focal point f1 are most efficiently obtained at the light tunnel inlet 21 compared to the light rays from the other LEDs. Thus, the whole light ray is brightest at the tunnel inlet 21 compared to different arrangements of those LEDs. The light tunnel 2 uniformly mixes the R, G and B light rays received from the inlet 21 and then provides resulting light rays to the color wheel 3.

The time-divisional driver 9 receives R, G and B image signals from the signal processor 101 and then supplies them and a black-and-white signal D based on the R, G and B image signals to the spatial modulator 6 in a time-divisional manner. The time-divisional driver 9 also produces timing signals based on the R, G and B image signals and black-and-white signal D and supplies the timing signals to the color wheel controller 8.

The color wheel controller 8 controls the color wheel motor 4 in accordance with the timing signals, thereby rotating the color wheel 3 having the R, G, B and D filters, such that R, G, B and D light components of light rays from the array of LEDs 12 of the light source apparatus 1 are applied to the spatial modulator 6 in a time-divisional manner in synchronization with time divisional driver 9 supplying the R, G, B and D image signals in a time-divisional manner to the spatial modulator 6. Then the spatial light modulator 6 creates an image signal based on the R, G, B and D signals with the aid of the micro mirrors and projects the image through the projecting lens 7 onto the screen S.

(Modification)

Figure 12:
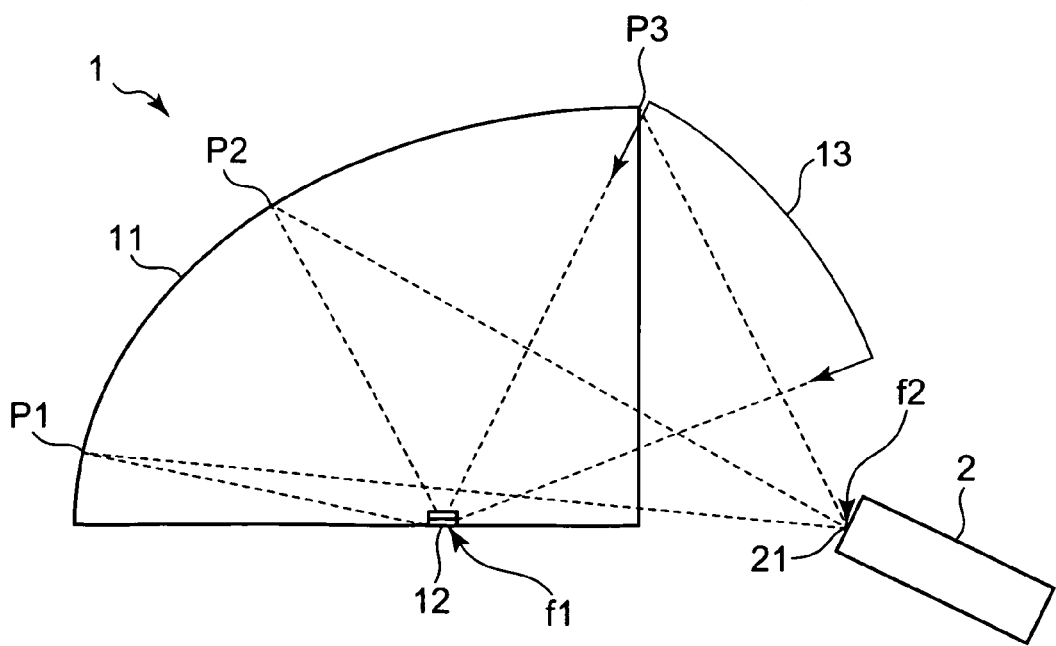
FIG. 12 illustrates a modification of the embodiment.

As shown in FIG. 12, a light source apparatus of this modification comprises a combination of the light source apparatus of FIG. 1 and an auxiliary concave reflector 13 in the form of a part of a sphere having a center coinciding with the first focal point f1 of the first mentioned reflector 11. The auxiliary reflector 13 is disposed between the reflector shell 11 and the second focal point f2. The auxiliary reflector inner surface is made of a reflective material so as to reflect light rays from the LEDs 12r, 12g and 12b of the array back into the reflector 13 to improve the efficiency of reflection.

Figure 13:
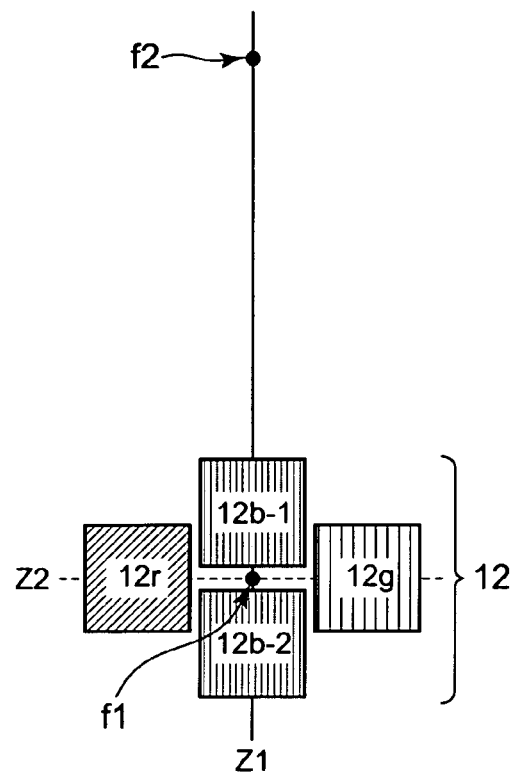
FIG. 13 is a layout of four LEDs employed to obtain at a second focal point light rays whose coloration is given priority over the brightness.

While in the above embodiment the array 12 is illustrated as composed of the three LEDs, the number of LEDs is not limited to three. For example, when the coloration of light rays to be focused at the second focal point f2 is given priority over the brightness, two blue LEDs 12b having the lowest efficiency of light emission may be provided in the array 12 such that the two blue LEDs 12b-1 and 12b-2 are arranged along the center line Z1 before and after of the first focal point f1 as viewed in the direction of the second focal point f2 with red and green LEDs 12r and 12g arranged on the left and right sides of the first focal point f1, respectively, or vice versa, on the line Z2 as shown in an example of FIG. 13. In this arrangement, increased blue light components are collected at the light tunnel inlet 21. Since the inlet 21 has the width W greater than its height H as shown in FIG. 3, blue light rays expand at the inlet. Thus, the coloration of the whole light rays obtained at the tunnel inlet 21 is given priority over the brightness.

Figure 14:
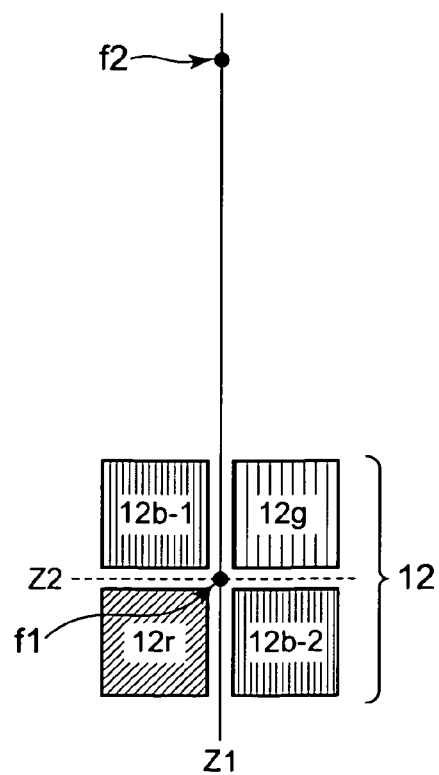
FIG. 14 is another layout of four LEDs similar to that of FIG. 13.

In an example of FIG. 14, blue LEDs 12b-1 and 12b-2 are arranged on the upper-left and lower-right sides of the position of the first focal point f1. Red and green LEDs 12r and 12g are arranged on the lower-left and upper-right sides of the position focal point f1 or vice versa. Also, in the example of FIG. 14 the coloration of the light rays at the second focal point f2 is given priority over the brightness of the light rays for the same reason as in the example of FIG. 13.

Figure 15:
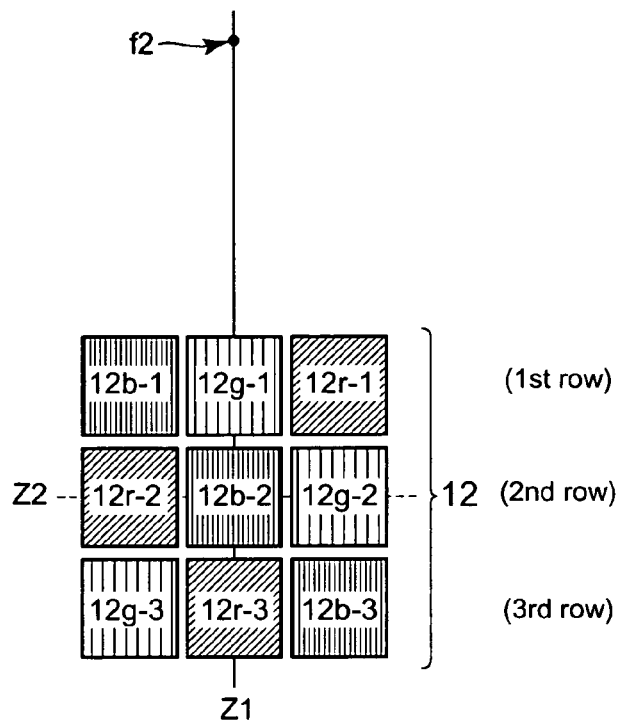
FIG. 15 is a layout of nine LEDs similar to that of FIG. 13.

In an example of FIG. 15, an LED array comprises three red LEDs 12r-1 to 12r-3, three green LEDs 12g-1 to 12g-3, and three blue LEDs 12b-1 to 12b-3 arranged such that the blue, green and red LEDs 12b-1, LED 12g-1 and LED 12r-1 are arranged in a first row intersecting with the center line Z1 at right angles; the red, blue and green LEDs 12r-2, 12b-2 and 12g-2 are disposed in a line Z2 or second row passing through the first focal point f1 and intersecting with the center line Z1 at right angles; and the green, red and blue LEDs 12g-3, 12r-3 and 12b-3 are disposed in a third row intersecting with the center line Z1 at right angles. According to this arrangement, the red, green and blue LEDs are disposed uniformly in the rows and columns of the array, and the coloration of the light rays to be focused at the second focal point f2 is given priority over the brightness of the light rays.

As described above, when the coloration of the light rays to be focused at the second focal point f2 is given priority over the brightness in an array of four or more LEDs, the number of blue LEDs 12b having the lowest efficiency of light emission is selected so as to be equal to, or more than, that of red LEDs 12r or green LEDs 12g.

Figure 16:
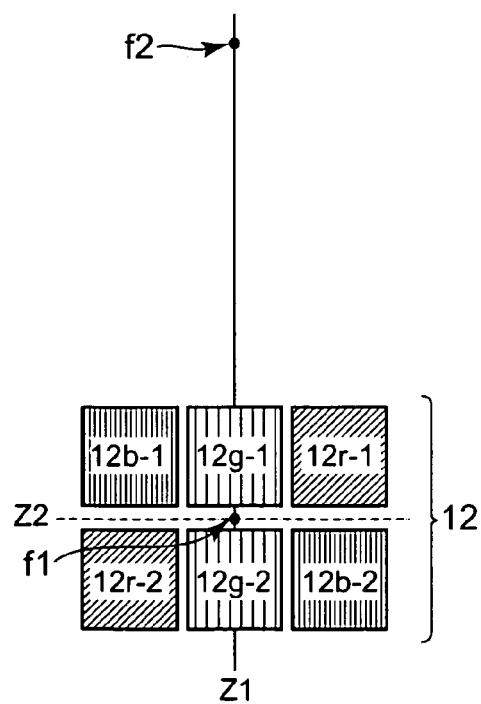
FIG. 16 is a layout of six LEDs to obtain at a second focal point light rays whose brightness is given priority over the coloration.

FIG. 16 shows another LED array that gives the brightness of the light rays priority over the coloration of the light rays at the second focal point f2. In this array, blue, green and red LEDs 12b-1, 12g-1 and 12r-1 are arranged in a first row intersecting with the center line Z1 at right angles and red, green and blue LEDs 12r-2, 12g-2 and 12-2b arranged in a second row intersecting with the center line Z1 at right angles such that the two green LEDs 12g-1 and 12g-2 are disposed along the center line Z1 before and after the first focal point f1. In this example, the brightness of the light rays to be focused at the second focal point f2 is given priority over the coloration of the light rays because the two green-colored LEDs having high spectral luminous efficiency are disposed along the center line Z1 before and after the first focal point f1, as shown.

Figure 17:
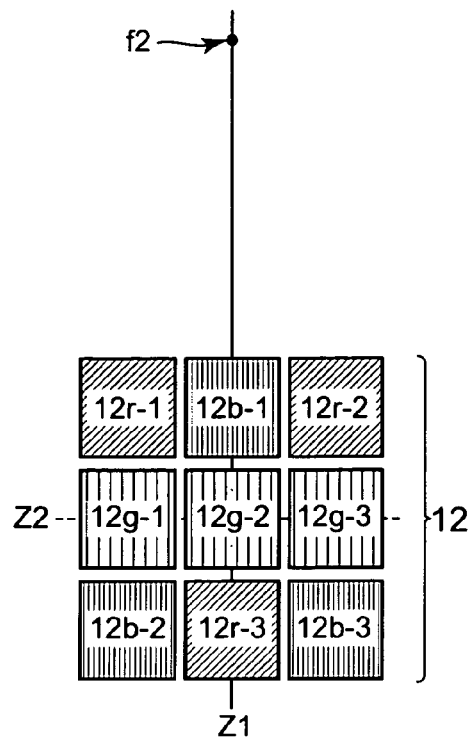
FIG. 17 is a layout of nine LEDs to obtain at a second focal point light rays whose brightness is given priority over the coloration.

Referring to FIG. 17, an example of a further array is shown which comprises red, blue and red LEDs 12r-1, 12b-1 and 12r-2 arranged in a first row; three green LEDs 12g-1, 12g-2 and 12g-3 arranged in a second row; and blue, red and blue LEDs 12b-2, 12r-3 and 12b-3 arranged in a third row such that the first-third rows intersect with the center line Z1 at right angles with the green LED 12g-2 positioned at the first focal point.

Figure 18:
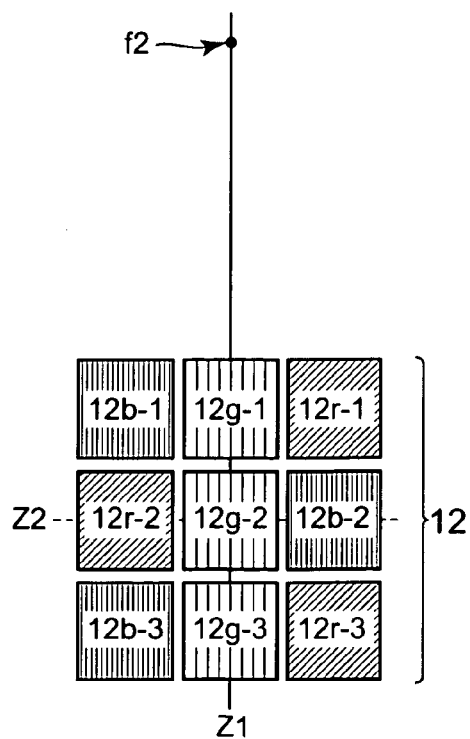
FIG. 18 is another layout of nine LEDs similar to that of FIG. 17.

FIG. 18 shows an example of a still further array. This array comprises blue, green and red LEDs 12b-1, 12g-1, and 12r-1 arranged in a first line; red, green and blue LEDs 12r-2, 12g-2 and 12b-2 arranged in a second line; and blue, green and red LEDs 12b-3, 12g-3 and 12r-3 arranged in a third line such that the second row is positioned on the line Z2 and the three green LEDs 12g-1, 12g-2 and 12g-3 are positioned on the center line Z1 with the green LED 12g-2 positioned at the first focal point f1. As in FIG. 3, the array of FIG. 17 provides considerably widthwise unified brightness in the tunnel inlet 21 compared to that of FIG. 18.

As described above, with the array of four or more LEDs that emit light rays whose brightness is given priority over the coloration at the second focal point f2, the number of green LEDs 12g that have the highest spectral luminous efficiency is required to be equal to, or more than, that of red or blue LEDs 12r or 12b.

(Modification 2)

While in the embodiment the color wheel is illustrated as used, green, red and blue LEDs may be used instead to emit corresponding colored rays of light in a time-divisional manner. The modification 2 of the projector that meets such arrangement will be described next with reference to FIGS. 19-21.

Figure 19:
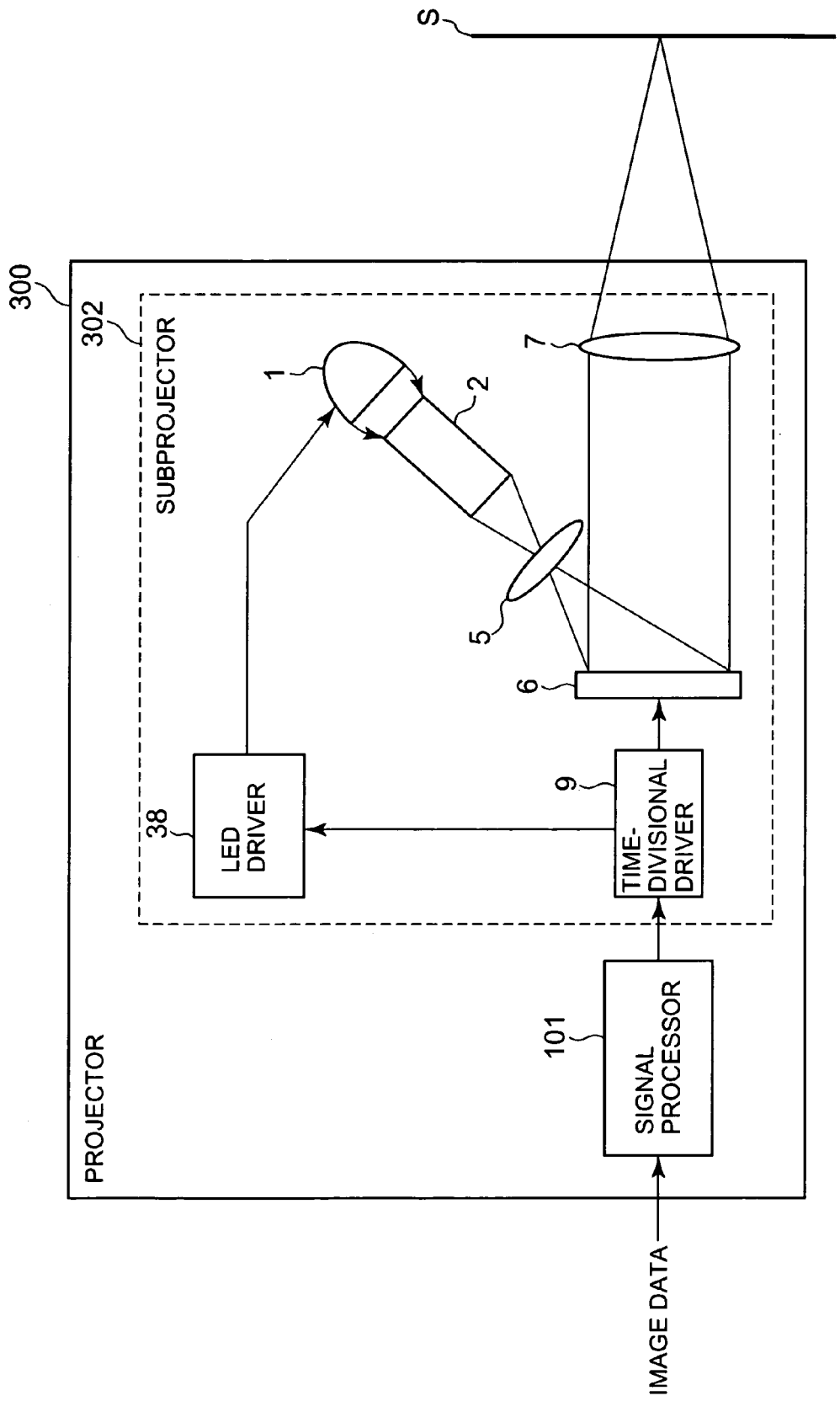
FIG. 19 is a block diagram of a second modification of the projector according to the present invention.

As shown in FIG. 19, the projector 300 of the modification 2 comprises a signal processor 101 and a subprojector 302. The signal processor 101 has the same structure and function as that of the first embodiment.

The subprojector 302 comprises a light source 1, a light tunnel 2, a light-source lens 5, a space light modulator 6, a projection lens 7, a time-divisional driver 9 and an LED driver 38. The light source 1, light tunnel 2, light-source lens 5, space light modulator 6, projection lens 7 and time-divisional driver 9 are the same in structure and function as corresponding ones of the embodiment 1. Note that the modulator 6 is directly irradiated with light emitted by the light tunnel 2 through the light source lens 5 (In this case, no color wheel such as shown at 3 in FIG. 10 is used). The number and positions of red, green and blue LEDs (including positional relationship between the respective LEDs and the light tunnel 2) are the same as the embodiment 1 and modification 1.

The LED driver 38 receives from the time-divisional driver 9 timing signals indicative of times at which the red, green and blue LEDs 12r, 12g and 12b disposed within the light source 1 are caused to emit corresponding rays of light in a time divisional manner.

Figure 20:
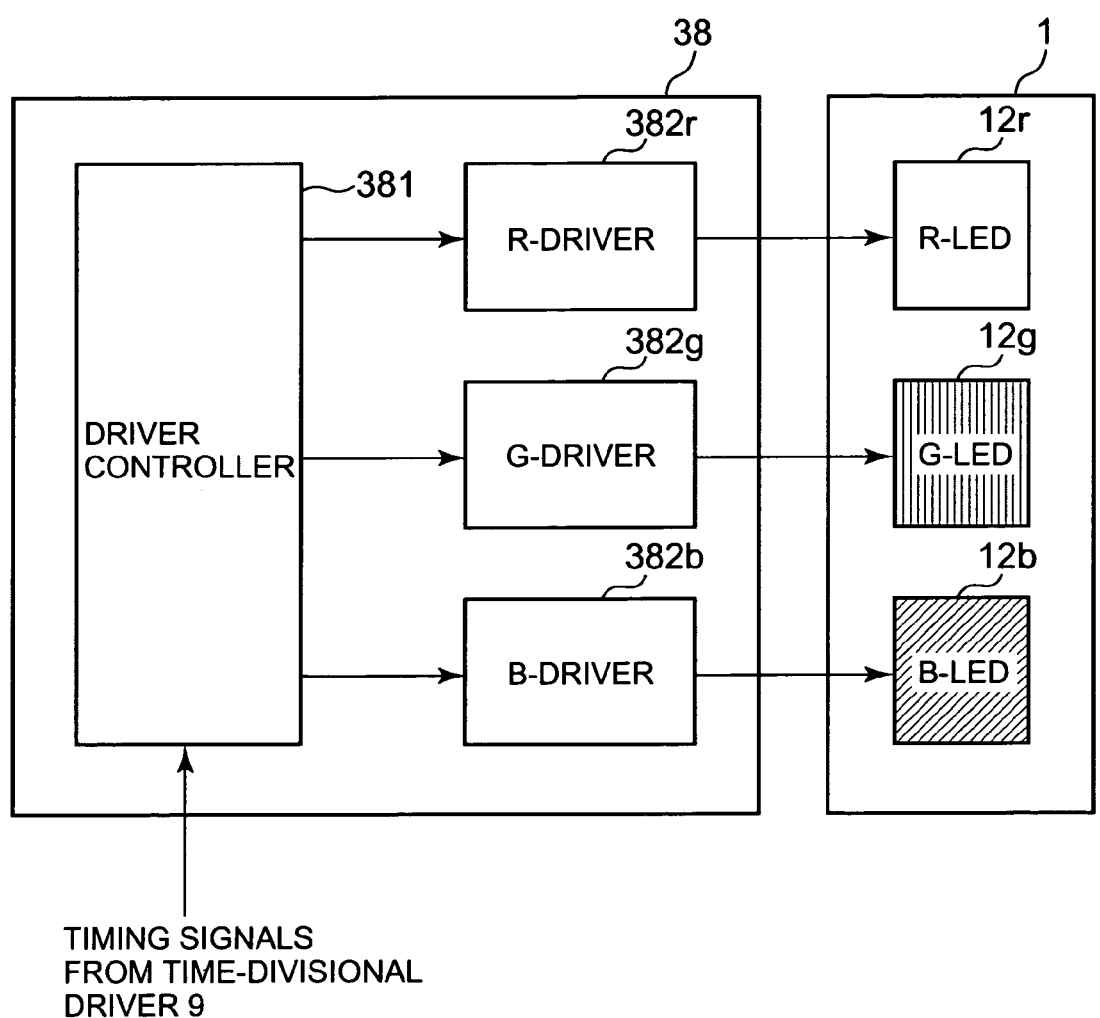
FIG. 20 is a block diagram of an LED driver and a light source of the projector of FIG. 19.

As shown in FIG. 20, the LED driver 38 comprises a driver controller 381, and red, green and blue light drivers 382r, 382g and 382b. The driver controller 381 provides red, green and blue light on-control signals to corresponding drivers 382r, 382g and 382b in accordance with the respective corresponding timing signals from the time-divisional driver 9.

When receiving the respective on-control signals, the red, green and blue drivers 382r, 382g and 382b supply corresponding drive signals to the corresponding LEDs 12r, 12g and 12b in a time-divisional manner as shown in FIG. 21, thereby causing the respective LEDs to emit corresponding colored light rays for the corresponding duration times of the drive signals. Each drive signal may comprise a PWM (Pulse Width Modulation) pulse train, for example.

Operation of the projector of this modification will be described next. The signal processor 101 processes image data received externally and then supplies R, G and B signals to the subprojector 102.

In the subprojector 102, the time-divisional driver 9 processes and supplies the red, green and blue signals in a time-divisional manner to the space light modulator 6. The time-divisional driver 9 supplies the LED driver 38 with timing signals indicative of times at which the red, green and blue images are projected onto the screen S. The driver controller 381 of the LED driver 38 sends red, green and blue on-signals in a time-divisional manner to the light drivers 382r, 382g and 382b in accordance with the timing signals. These light drivers 382r, 382g and 382b respond to the on-signals and supply corresponding drive signals to the corresponding LEDs 12, thereby causing the same to emit corresponding colored rays of light in a time-divisional manner, as shown at (a), (b) and (c) in FIG. 21. Thus, the space light modulator 6 are irradiated in a time-divisional manner with the red, green and blue light rays through the light tunnel 2 and the lens 5.

The space modulator 6 projects light rays emitted by the light source 1 onto the screen S through the lens 7 based on the red, green and blue signals supplied in a time-divisional manner by the time-divisional driver 9.

This modification produces advantageous effects similar to those produced by the embodiment 1 without using mechanical parts such as the color wheel and its drive motor. Since no such mechanical parts need be disposed, the projector is reduced in size and hence a rate of trouble occurrence is reduced. This modification is high in light use efficiency compared to the projector of the embodiment 1, thereby reducing power consumption.

While the three different LEDs 12r, 12g and 12b are illustrated as arranged in the light source for purposes of understanding, the number of LEDs is optional. A feedback circuit (not shown) may be used to detect the respective emission strengths of the red, green and blue LEDs to control the corresponding pulse widths and numbers of the drive signals, thereby controlling the energy of light emission.

Instead of the LEDs used in the above embodiment, semiconductor lasers, electroluminescence elements having low luminance or incandescent lamps may be used.

While in the above embodiment the light source apparatus 1 is illustrated for use with the projector, the light source apparatus 1 may be used for photographic developing devices.

Various modifications and changes may be made thereunto without departing from the broad spirit and scope of this invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2005-072870 filed on Mar. 15, 2005 and including specification, claims, drawings and summary. The disclosure of the above Japanese patent application is incorporated herein by reference in its entirety.

What is claimed is:

1. A light source apparatus comprising:
a first reflector having an inner reflective surface complementary to a part of an outer surface of an ellipsoid with a pair of focal points, the first reflector having a focal point within the inner surface thereof coinciding in position with one of the pair of focal points; and
an array of light emitting elements disposed in a vicinity of the focal point within the inner surface of the first reflector;
wherein light rays emitted by the light emitting elements of the array are reflected by the inner surface of the first reflector so as to be focused in a vicinity of a point coinciding in position with the other of the pair of focal points; and
wherein one of: (i) a light emitting element of the array that has a lowest efficiency of light emission is disposed on a straight line that extends through the pair of focal points such that coloration of the light rays to be focused in the vicinity of the point coinciding in position with the other of the pair of focal points is given priority over brightness, and (ii) a light emitting element of the array that has a highest spectral luminous efficiency is disposed on the line that extends through the pair of focal points such that the brightness of the light rays to be focused in the vicinity of the point coinciding in position with the other of the pair of focal points is given priority over the coloration.

2. The light source apparatus of claim 1, further comprising:
a second reflector having an inner reflective surface complementary to a part of an outer surface of a sphere whose center coincides with the focal point within the inner surface of the first reflector, the second reflector being disposed on a side of the other of the pair of focal points with respect to first reflector such that the second reflector reflects light rays from the array of light emitting elements back into the first reflector.

3. The light source apparatus of claim 1, wherein the light emitting elements of the array are disposed along a straight line that intersects, at the focal point of the first reflector, at right angles with the line that extends through the pair of focal points, and each of the light emitting elements emits a different colored light ray.

4. The light source apparatus of claim 1, wherein the light emitting element of the array that has the lowest efficiency of light emission is disposed at the focal point within the inner surface of the first reflector.

5. The light source apparatus of claim 1, wherein a plurality of the light emitting elements of the array that have the lowest efficiency of light emission are disposed on the line that extends through the pair of focal points.

6. The light source apparatus of claim 5, wherein the plurality of the light emitting elements of the array that have the lowest efficiency of light emission comprise two light emitting elements disposed on opposite sides of the focal point within the inner surface of the first reflector and on the line that extends through the pair of focal points.

7. The light source apparatus of claim 1, wherein the light emitting element of the array that has the highest spectral luminous efficiency is disposed at the focal point within the inner surface of the first reflector.

8. The light source apparatus of claim 1, wherein a plurality of the light emitting elements of the array that have the highest spectral luminous efficiency are disposed on the line that extends through the pair of focal points.

9. The light source apparatus of claim 8, wherein the plurality of the light emitting elements of the array that have the highest spectral luminous efficiency comprise two light emitting elements disposed on opposite sides of the focal point within the inner surface of the first reflector and on the line that extends through the pair of focal points.

10. A projector comprising:
(a) a light source apparatus comprising:
a first reflector having an inner reflective surface complementary to a part of an outer surface of an ellipsoid with a pair of focal points, the first reflector having a focal point within the inner surface thereof coinciding in position with one of the pair of focal points; and
an array of light emitting elements disposed in a vicinity of the focal point within the inner surface of the first reflector;
wherein light rays emitted by the array of light emitting elements are reflected by the inner surface of the first reflector so as to be focused in a vicinity of a point coinciding in position with the other of the pair of focal points; and
wherein one of: (i) a light emitting element of the array that has a lowest efficiency of light emission is disposed on a straight line that extends through the pair of focal points such that coloration of the light rays to be focused in the vicinity of the point coinciding in position with the other of the pair of focal points is given priority over brightness, and (ii) a light emitting element of the array that has a highest spectral luminous efficiency is disposed on the line that extends through the pair of focal points such that the brightness of the light rays to be focused in the vicinity of the point coinciding in position with the other of the pair of focal points is given priority over the coloration;
(b) a light tunnel having an inlet positioned at the point coinciding in position with the other of the pair of focal points of the ellipsoid for allowing light rays emitted by the array of light emitting elements to pass therethrough;
(c) a time-divisional driver for outputting three primary-colored image signals based on image data in a time-divisional manner;
(d) a spatial light modulator which is irradiated with the light rays that have passed through the light tunnel, for reflecting and projecting the light rays as an image based on one of the three primary-colored image signals onto a display screen; and
(e) an optical controller for changing a color of the light rays with which the spatial light modulator is irradiated so as to match a corresponding one of the three primary-colored images signals outputted in a time-divisional manner by the time-divisional driver.

11. The projector of claim 10, further comprising:
a second reflector having an inner reflective surface complementary to a part of an outer surface of a sphere whose center coincides with the focal point of the first reflector, the second reflector being disposed on a side of the other of the pair of focal points with respect to the first reflector such that the second reflector reflects light rays from the array of light emitting elements back into the first reflector.

12. The projector of claim 10, wherein the optical controller comprises a color separator for separating the light rays discharged from the light tunnel into three primary-colored components in a time-divisional manner.

13. The projector of claim 10, wherein the light emitting elements of the array include three primary-colored light emitting elements, and the optical controller comprises means for driving the three primary-colored light emitting elements of the array sequentially in a time-divisional manner.

14. The projector of claim 10, wherein the light emitting element of the array that has the lowest efficiency of light emission is disposed at the focal point within the inner surface of the first reflector.

15. The projector of claim 10, wherein a plurality of the light emitting elements of the array that have the lowest efficiency of light emission are disposed on the line that extends through the pair of focal points.

16. The projector of claim 15, wherein the plurality of the light emitting elements of the array that have the lowest efficiency of light emission comprise two light emitting elements disposed on opposite sides of the focal point within the inner surface of the first reflector and on the line that extends through the pair of focal points.

17. The projector of claim 10, wherein the light emitting element of the array that has the highest spectral luminous efficiency is disposed at the focal point within the inner surface of the first reflector.

18. The projector of claim 10, wherein a plurality of the light emitting elements of the array that have the highest spectral luminous efficiency are disposed on the line that extends through the pair of focal points.

19. The projector of claim 18, wherein the plurality of the light emitting elements of the array that have the highest spectral luminous efficiency comprise two light emitting elements disposed on opposite sides of the focal point within the inner surface of the first reflector and on the line that extends through the pair of focal points.

20. A light source apparatus comprising:

a reflector having an inner reflective surface complementary to a part of an outer surface of an ellipsoid with a pair of focal points, the reflector having a focal point within the inner surface thereof coinciding in position with one of the pair of focal points; and an array of light emitting elements disposed in a vicinity of the focal point within the inner surface of the reflector;

wherein light rays emitted by the light emitting elements of the array are reflected by the inner surface of the reflector so as to be focused in a vicinity of a point coinciding in position with the other of the pair of focal points; and wherein the array of light emitting elements comprises a plurality of light emitting elements arranged in a square-shaped matrix.

21. A projector comprising:

(a) a light source apparatus comprising:

a first reflector having an inner reflective surface complementary to a part of an outer surface of an ellipsoid with a pair of focal points, the first reflector having a focal point within the inner surface thereof coinciding in position with one of the pair of focal points; and an array of light emitting elements disposed in a vicinity of the focal point within the inner surface of the first reflector;

wherein light rays emitted by the array of light emitting elements are reflected by the inner surface of the first reflector so as to be focused in a vicinity of a point coinciding in position with the other of the pair of focal points; and wherein the array of light emitting elements comprises a plurality of light emitting elements arranged in a square-shaped matrix;

(b) a light tunnel having an inlet positioned at the point coinciding in position with the other of the pair of focal points of the ellipsoid for allowing light rays emitted by the array of light emitting elements to pass therethrough;

(c) a time-divisional driver for outputting three primary-colored image signals based on image data in a time-divisional manner;

(d) a spatial light modulator which is irradiated with the light rays that have passed through the light tunnel, for reflecting and projecting the light rays as an image based on one of the three primary-colored image signals onto a display screen; and (e) an optical controller for changing a color of the light rays with which the spatial light modulator is irradiated so as to match a corresponding one of the three primary-colored images signals outputted in a time-divisional manner by the time-divisional driver.

22. The projector of claim 21, further comprising:

a second reflector having an inner reflective surface complementary to a part of an outer surface of a sphere whose center coincides with the focal point of the first reflector, the second reflector being disposed on a side of the other of the pair of focal points with respect to the first reflector such that the second reflector reflects light rays from the array of light emitting elements back into the first reflector.

23. The projector of claim 21, wherein the optical controller comprises a color separator for separating the light rays discharged from the light tunnel into three primary-colored components in a time-divisional manner.

24. The projector of claim 21, wherein the light emitting elements of the array include three primary-colored light emitting elements, and the optical controller comprises means for driving the three primary-colored light emitting elements of the array sequentially in a time-divisional manner.

* * * * *